United States Patent
Yakushev et al.

(10) Patent No.: US 12,405,371 B1
(45) Date of Patent: Sep. 2, 2025

(54) MULTISITE RADAR SYSTEM FOR AIRBORNE TRAFFIC DETECTION

(71) Applicant: Daedalean AG, Zurich (CH)

(72) Inventors: Grigory Yakushev, Wettswil am Albis (CH); Luuk Adriaan Cornelis van Dijk, Bellinzona (CH)

(73) Assignee: Daedalean AG, Zurich (CH)

( * ) Notice: Subject to any disclaimer, the term of this patent is extended or adjusted under 35 U.S.C. 154(b) by 428 days.

(21) Appl. No.: 17/866,041

(22) Filed: Jul. 15, 2022

(51) Int. Cl.
   *G01S 13/933* (2020.01)
   *G01S 7/40* (2006.01)
   *G08G 5/26* (2025.01)
   *G08G 5/56* (2025.01)

(52) U.S. Cl.
   CPC .......... *G01S 13/933* (2020.01); *G01S 7/4056* (2013.01); *G08G 5/26* (2025.01); *G08G 5/56* (2025.01)

(58) Field of Classification Search
   None
   See application file for complete search history.

(56) References Cited

U.S. PATENT DOCUMENTS

| | | | |
|---|---|---|---|
| 8,723,721 B2 | 5/2014 | Moruzzis | |
| 8,730,092 B2 | 5/2014 | Jaffer | |
| 9,954,955 B2 | 4/2018 | Davis | |
| 10,281,569 B2 | 5/2019 | Muller | |
| 11,280,893 B2 | 3/2022 | Trainin | |
| 11,579,282 B2 | 2/2023 | Rao | |
| 11,582,305 B2 | 2/2023 | Davis | |
| 2005/0275582 A1* | 12/2005 | Mohan | G01S 13/003 342/27 |
| 2011/0169684 A1* | 7/2011 | Margolin | G01S 13/003 342/30 |
| 2018/0241122 A1* | 8/2018 | Jalali Mazlouman | H01Q 3/34 |
| 2021/0173065 A1 | 6/2021 | Trainin | |
| 2021/0311203 A1* | 10/2021 | Reis | G01S 19/38 |
| 2022/0260697 A1 | 8/2022 | Saitto | |
| 2022/0283285 A1 | 9/2022 | Lehman | |
| 2023/0047968 A1 | 2/2023 | Jácome Muñoz | |

* cited by examiner

*Primary Examiner* — Whitney Moore
(74) *Attorney, Agent, or Firm* — Esplin & Associates, PC

(57) ABSTRACT

Systems and methods to detect airborne traffic between multiple airborne aircraft are disclosed. Exemplary implementations may include a set of multiple stationary transmitters that generate and transmit information packets. Individual receivers included in aircraft may receive radar signals with information, including the information packets, and reflections of the information packets from one or more targets (i.e., airborne objects such as other aircraft), all from multiple stationary transmitters. Using the received radar signals, individual receivers may determine the current geographical location of the individual receivers, and the current geographical locations of the one or more targets.

20 Claims, 6 Drawing Sheets

MULTISITE RADAR SYSTEM FOR AIRBORNE TRAFFIC DETECTION

FIELD OF THE DISCLOSURE

The present disclosure relates to systems and methods to detect airborne traffic between multiple airborne aircraft, using a set of stationary transmitters and aircraft-specific receivers.

BACKGROUND

Aircraft are known. Radar systems are known, usually having a transmitter in the same location as a receiver.

SUMMARY

One aspect of the present disclosure relates to a multisite radar system configured for airborne traffic detection between multiple airborne aircraft including a first aircraft. As used herein, the term "aircraft" is used for both singular and plural. The first aircraft includes a first receiver. The multisite radar system includes a set of multiple stationary transmitters. Individual ones of the set of multiple stationary transmitters include one or more hardware processors configured by machine-readable instructions. Individual ones of the set of multiple stationary transmitters may be configured to (i) generate an information packet, and (ii) transmit the information packet. The first receiver may be configured to receive radar signals from the set of multiple stationary transmitters. The first receiver may include an antenna array configured to receive the radar signals, which convey information. The conveyed information may include (a) the information packet, and (b) one or more reflections of the information packet from one or more targets. The first receiver may be configured to demodulate the conveyed information, determine current geographical location of the first receiver based on the conveyed information, and determine one or more current geographical locations of the one or more targets, based on the current geographical location of the first receiver and on the conveyed information.

Another aspect of the present disclosure related to a method of detecting airborne traffic between multiple airborne aircraft including a first aircraft, wherein the first aircraft includes a first receiver. The method may include, for individual ones of a set of multiple stationary transmitters, (i) generating an information packet; and (ii) transmitting the information packet. The information packet may include a current timestamp, location information of an individual transmitter antenna included in the individual stationary transmitter, and/or other information. The method may include receiving radar signals, by an antenna array included in the first receiver. The method may include demodulating the received radar signals to obtain the conveyed information. The method may include determining current geographical location of the first receiver based on the conveyed information. The method may include determining one or more current geographical locations of the one or more targets, based on the current geographical location of the first receiver and on the conveyed information.

As used herein, any association (or relation, or reflection, or indication, or correspondency, or correlation) involving aircraft, transmitters, receivers, targets, antennas, timeframes, information packets, pulses, data packets, reflections, servers, processors, client computing platforms, users, output signals, events, locations, instructions, identifiers, notifications, determinations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
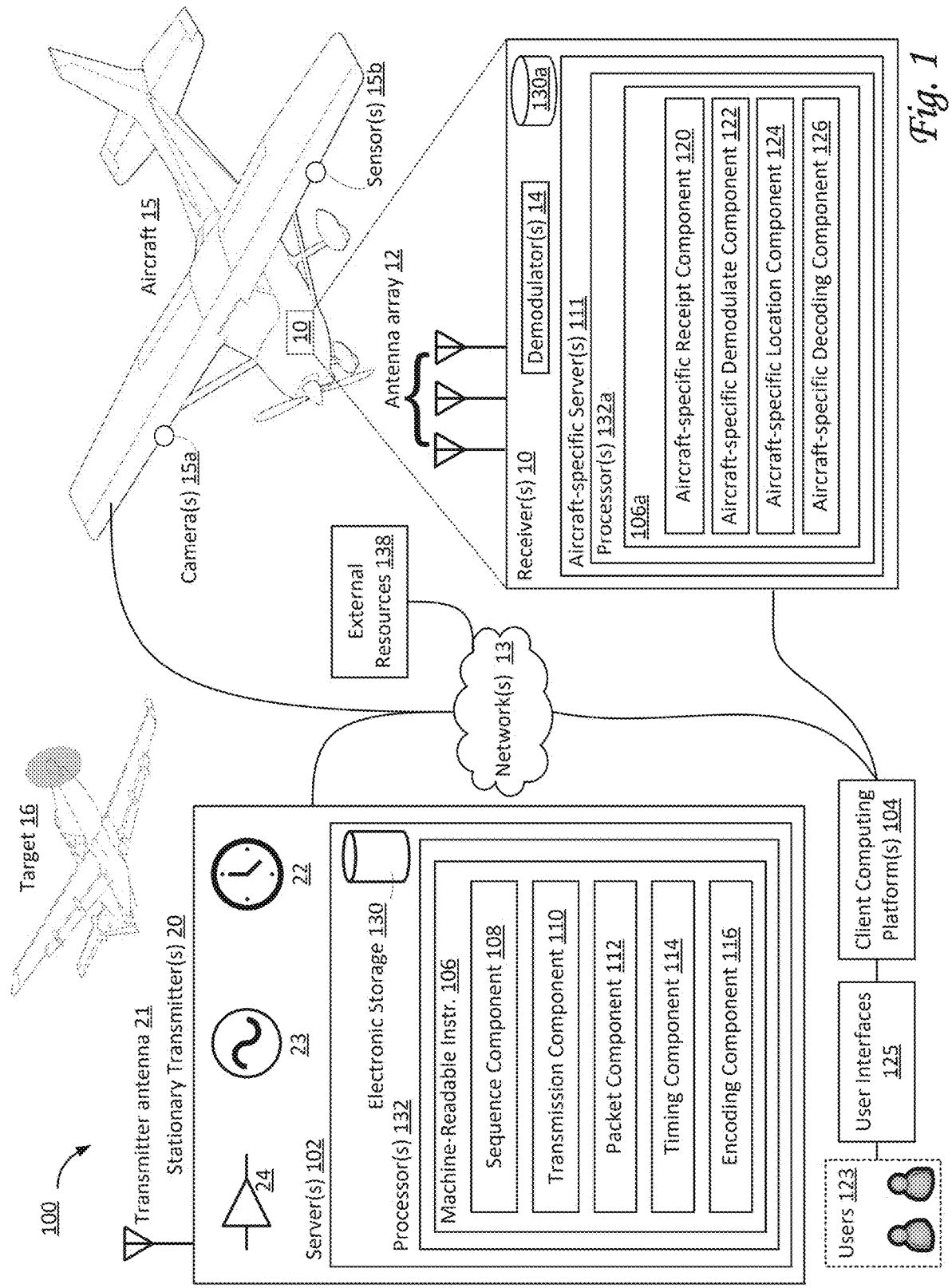
FIG. 1 illustrates a multisite radar system configured for airborne traffic detection between multiple airborne aircraft, in accordance with one or more implementations.

FIG. 1 illustrates a multisite radar system 100 configured for airborne traffic detection between multiple airborne aircraft including a particular aircraft 15 and a particular target 16 (or target aircraft 16), in accordance with one or more implementations. Multisite radar system 100 may include one or more of a set of stationary transmitters 20, a set of receivers 10, client computing platform(s) 104, user interface(s) 125, and/or other components. Individual receivers are included in individual aircraft. For example, a particular receiver 10 may be included in particular aircraft 15. Set of stationary transmitters 20 is arranged in an area (e.g., a developed, urban area) in a manner that provides overlapping coverage for the transmitted information from different stationary transmitters. Receivers in this area may receive signals directly from individual stationary transmitters and as reflections from objects in this area (including airborne targets). By virtue of the features described in this disclosure, individual receivers may determine both their own geographical location within this area, as well as the geographical locations of airborne aircraft (including target 16) in this area. Detection of other airborne objects, in particular aircraft, while flying is needed to avoid collisions, among other issues. Users 123 (also referred to as users) may include one or more of a first user, a second user, a third user, and/or other users. As used in descriptions herein, any use of the term "user" may refer to user(s) 123, unless indicated otherwise.

Figure 4:
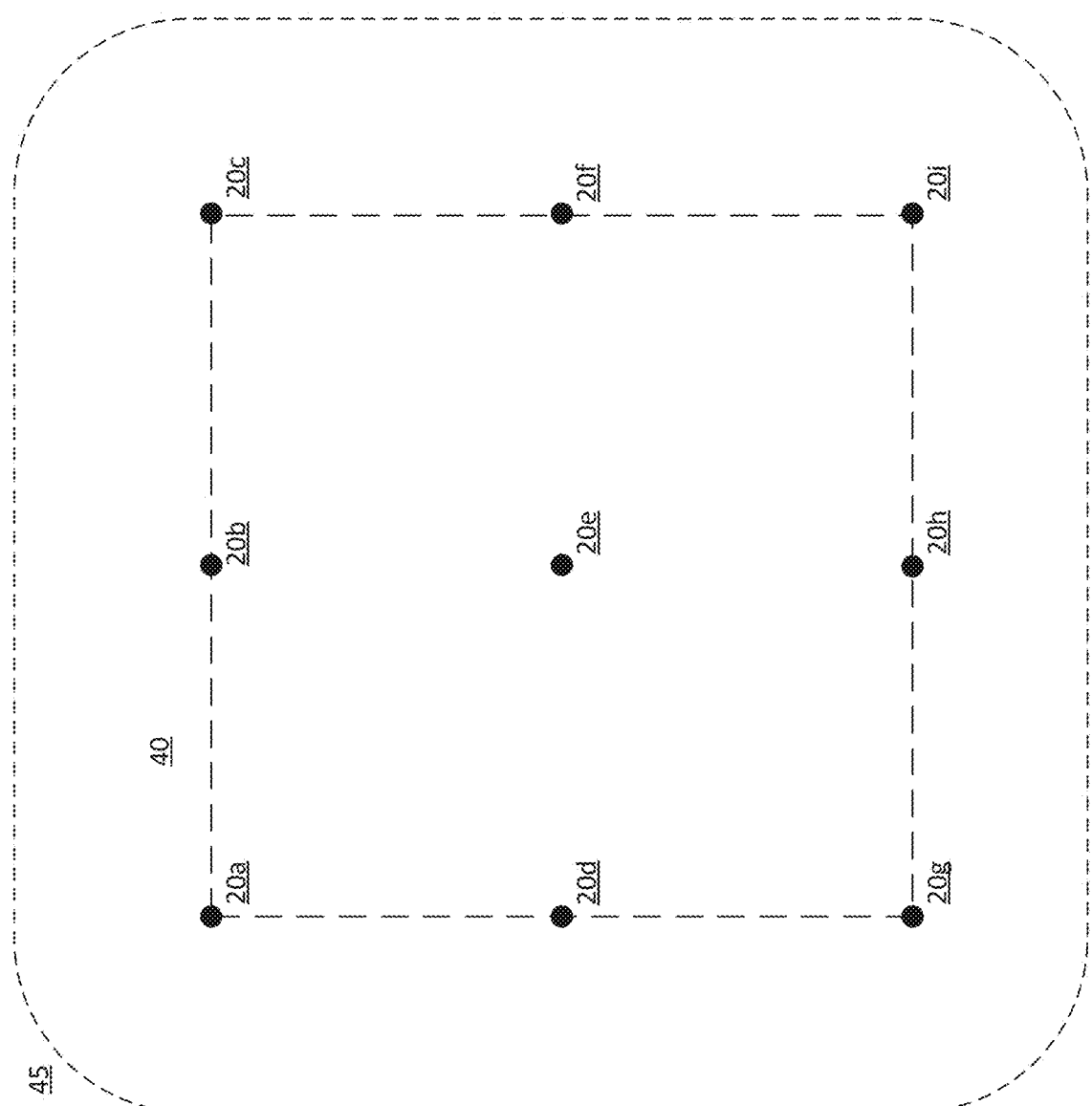
FIG. 4 illustrates an exemplary operational area and detection space as may be used in a multisite radar system configured for airborne traffic detection between multiple airborne aircraft, using an arrangement of nine stationary transmitters, in accordance with one or more implementations.

In some implementations, set of stationary transmitters 20 may be arranged in a (two-dimensional) grid, as shown in FIG. 4, having a bounding box (or polygon) around the stationary transmitters 20 that is referred to as operational area 40, and having a larger rectangle with rounded corners outside of operational area 40 that is referred to as detection space 45. The real-world three-dimensional operational area and detection space is assumed to be limited to a predetermined altitude, the predetermined altitude being about 2 km, about 3 km, about 4 km, and/or another altitude. Targets within the detection space can be detected as described herein. However, this arrangement is merely exemplary and not intended to be limiting in scope. Typically, the covered area will be urban and/or developed, e.g., metropolitan. As shown in FIG. 4, adjacent stationary transmitters may be arranged about 20 km apart, and detection space 45 may extend about 10.5 km outside the operational area on all sides. As shown here, operational area 40 is about 1600 km$^2$. By extending this pattern of transmitters, an operational area of 3600 km$^2$ could be covered using 16 stationary transmitters, and an operational area of 6400 km$^2$ could be covered using 25 stationary transmitters, and so forth. As shown here, the nearest stationary transmitter for any receiver in detection space 45 would be less than 15 km.

Referring to FIG. 1, individual stationary transmitters 20 may include one or more of server(s) 102, processor(s) 132, electronic storage 130, a transmitter antenna 21, a clock 22, an oscillator 23, an amplifier 24, and/or other components. Multisite radar system 100 includes at least three stationary transmitters 20.

Individual receivers 10 may include one or more of aircraft-specific server(s) 111, processor(s) 132a, electronic storage 130a, an antenna array 12, demodulator(s) 14, and/or other components. Each individual receiver 10 is specific to an individual aircraft. In some implementations, individual receivers 10 may include individual oscillators, similar to oscillator 23. In some implementations, individual receivers 10 may include an inertial measurement unit (IMU), not depicted here.

In some implementations, server(s) 102 and/or aircraft-specific server(s) 111 may be configured to communicate with one or more client computing platforms 104 according to a client/server architecture and/or other architectures. In some implementations, client computing platform(s) 104 may be configured to communicate with other client computing platforms via server(s) 102 and/or aircraft-specific server(s) 111, wherein the communication uses a peer-to-peer architecture and/or other architectures. Users may access multisite radar system 100 via client computing platform(s) 104. In some implementations, multisite radar system 100 and/or components thereof may be configured to communicate with one or more of users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a sequence component 108, a transmission component 110, a packet component 112, a timing component 114, an encoding component 116, and/or other instruction components.

Aircraft-specific server(s) 111 may include electronic storage 130a, processor(s) 132a, machine-readable instructions 106a, and/or other components. Aircraft-specific server(s) 111 may be configured by machine-readable instructions 106a. Electronic storage 130a may be similar to electronic storage 130, though included in aircraft-specific server(s) 111. Processor(s) 132a may be similar to processor(s) 132, though included in aircraft-specific server(s) 111. Machine-readable instructions 106a may be similar to machine-readable instructions 106, though included in aircraft-specific server(s) 111. The instruction components for machine-readable instructions 106a may include one or more of an aircraft-specific receipt component 120, an aircraft-specific demodulate component 122, an aircraft-specific location component 124, an aircraft-specific decoding component 126, and/or other instruction components.

Transmitter antenna 21 may be configured to transmit information, including but not limited to information packets, (high-power) pulses, data packets (also referred to as low-power pulses), continuous waves, and/or other information. In some implementations, operations of transmitter antenna 21 may be controlled by transmission component 110. In some implementations, transmitter antenna 21 may transmit information carried on a carrier signal, e.g., as provided by oscillator 23. Transmitter antenna 21 may transmit omnidirectional pulses using the carrier frequency of the carrier signal. In some implementations, transmitter antenna 21 may transmit information in accordance with a particular modulation scheme.

Clock 22 may be configured to provide timing information to stationary transmitter 20. In some implementations, clock 22 may be an atomic clock. In some cases, operations of stationary transmitter 20 may be timed based on information from clock 22. In some implementations, timing information from clock 22 may be included in the information transmitted by transmitter antenna 21. In some implementations, clock 22 may generate and/or provide timestamps.

Oscillator 23 may be configured to generate a carrier signal. In some cases, the carrier signal may be 15.6 GHz. In some cases, the carrier signal may be about 2 GHz, 4 GHZ, 8 GHz, 16 GHZ, 32 GHz, and/or another frequency. Other frequencies are contemplated within the scope of this disclosure. Information to be transmitted by stationary transmitter 20 may be based on a particular modulation scheme. In some cases, the particular modulation scheme uses discrete pulses and/or discrete data packets. In some cases, the particular modulation scheme uses continuous wave (CW) technology. For example, the continuous wave (CW) technology used for the particular modulation scheme may be based on at least one of (i) Frequency Modulated Continuous Wave (FMCW), (ii) Orthogonal Frequency Division Multiplexing (OFDM), and/or (iii) another type of CW technology. In some implementations, the modulation scheme may include phase modulation. In some implementations, the modulation scheme may include amplitude modulation. In some implementations, the modulation scheme may include both phase and amplitude modulation (e.g., a 10 Mb/s, or 15 Mb/s, or 20 Mb/s, or 25 Mb/s modulation scheme). In some implementations, a requirement of multisite radar system 100 may be to use a bandwidth of 100 MHz or less.

Amplifier 24 may be configured to amplify signals for stationary transmitter 20. In some implementations, a particular signal to be transmitted may be amplified by amplifier 24 prior to being provided to transmitter antenna 21. In some implementations, using discrete pulses of about 1 μs, amplifier 24 may be configured to deliver about 3 MW for 1 us every 1 ms, or about 3 kW average power for multisite radar system 100 using an arrangement as shown in FIG. 4. In other implementations, using longer discrete pulses (e.g., ranging from 20-150 μs), amplifier 24 may be configured to deliver less than 3 MW for 1 μs every 1 ms (i.e., less power may be needed in these cases). In yet other implementations, using continuous wave technology, amplifier 24 may be configured to deliver even less power. In other words, less power may be needed with continuous wave technology, compared to discrete pulses.

Antenna array 12 (of an individual receiver such as receiver 10) may be configured to receive radar signals. In some implementations, antenna array 12 may be configured to detect a 4 decibels per square meter (dBsm) radar cross section (RCS) target at 10.5 km. In some implementations, antenna array 12 may be a 3×3 phased antenna array of (dipole) antenna elements.

Demodulator(s) 14 (of an individual receiver such as receiver 10) may be configured to demodulate a signal, in particular a modulated signal. In some implementations, receiver 10 may include nine demodulators that correspond to individual (dipole) antenna elements of antenna array 12.

Sequence component 108 may be configured to generate and/or otherwise assemble information, including information to be transmitted. In some implementations, the generated information may include a multi-bit sequence. In some cases, the multi-bit sequence may include at least 10 bits. In some cases, at least a portion of a multi-bit sequence may be randomized. For example, subsequent multi-bit sequences used in subsequent timeframes are different. In some cases, at least a portion of a multi-bit sequence may be specific to an individual stationary transmitter 20. As used herein, sequences may be deemed randomized if a subsequent sequence cannot easily be derived (e.g., by an external third party) from one or more preceding sequences. Information generated and/or otherwise assembled by sequence component 108 may be used to create a (discrete) pulse for transmission by transmission component 110. For example, a high-power pulse may have and/or use a particular power level. In some implementations, information generated and/or otherwise assembled by sequence component 108 may be used for transmission using a particular modulation scheme.

Transmission component 110 may be configured to transmit information packets, pulses, data packets, and/or other information. By way of non-limiting example, transmitted pulses may include high-power pulses having and/or using a first power level. An individual high-power pulse may include and/or otherwise encode the multi-bit sequence (e.g., generated by sequence component 108). In some implementations, the multi-bit sequence may be encoded in the amplitude channel and a fixed pattern may be encoded in the phase channel. In some implementations, a transmitted high-power pulse may have a duration of about 1 microsecond (μs). Other durations are considered within the scope of this disclosure. By way of non-limiting example, transmitted data packets (or low-power pulses) may have and/or use a second power level that is lower than the first power level. In some implementations, a transmitted data packet may have a duration of about 100 μs. Other durations are considered within the scope of this disclosure. In some implementations, a transmitted packet may contain about 2 kb of information. In some implementations, a transmitted packet may contain less than 2 kb of information. In some implementations using discrete pulses, for an individual stationary transmitter, an individual timeframe may include a single high-power pulse, followed by a predetermined delay duration of almost half a timeframe duration, followed by a single data packet (and optionally followed by another shorter delay duration). In some implementations using discrete pulses, for an individual stationary transmitter, an individual timeframe may include a single information packet (optionally followed by a delay duration). For example, individual timeframes may span about 0.5 ms, 1 ms, 1.5 ms, 2 ms, and/or another duration. In some cases, the timeframe may be defined as the duration between subsequent transmitted packets or pulses. In some implementations, an individual timeframe may be used for transmissions by an individual stationary transmitter 20. For example, a first timeframe may be used by a first individual stationary transmitter 20, followed by a second timeframe that is used by a second individual stationary transmitter 20, followed by a third timeframe that is used by a third individual stationary transmitter 20, and so forth. Once all available and operational stationary transmitters have made individual transmissions, set of stationary transmitters 20 may start anew. Accordingly, by way of non-limiting example, for a set of nine stationary transmitters, each individual transmitter may have a specific and dedicated individual timeframe of 1 ms every 9 ms. Likewise, for a set of sixteen stationary transmitters, each individual transmitter may have a specific and dedicated individual timeframe of 1 ms every 16 ms, and so forth.

In some implementations, delay durations may be based on operations of timing component 114. In some implementations, operations of different timing components included in different individual stationary transmitters may be synchronized and/or otherwise timed such that the set of stationary transmitters uses a sequence of timeframes, wherein adjacent timeframes are used by different stationary transmitters. In some implementations, the predetermined delay duration is longer than the longest propagation delay from an individual one of the set of multiple stationary transmitters 20 via an individual one of the one or more targets 16 to an individual receiver 10. In other words, the delay duration is sufficiently long such that reflections from targets 16 have been received by receivers 10, before the next timeframe starts. Accordingly, the delay duration is based on the distance between adjacent stationary transmitters 20, as well as the arrangement of the set of stationary transmitters

20. As the operational area increases, the delay duration increases, and individual timeframes increase. For example, for the arrangement shown in FIG. 4, a suitable delay duration may be at least 270 μs. Accordingly, in this example, a timeframe of 1 ms is more than long enough.

Figure 6A:
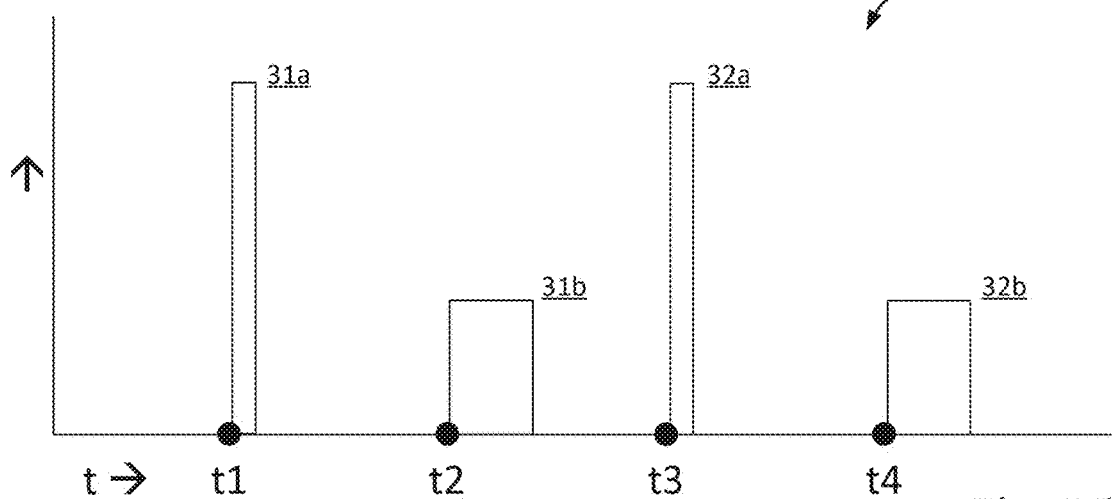
FIG. 6A illustrates an exemplary timeline depicting two timeframes as may be used in a multisite radar system configured for airborne traffic detection between multiple airborne aircraft, in accordance with one or more implementations.

By way of non-limiting example, FIG. 6A illustrates an exemplary timeline 300 depicting two subsequent timeframes as may be used in multisite radar system 100. The horizontal axis depicts time, including sequential moments t1, t2, t3, and t4. The vertical axis depicts power level. At a moment t1, a high-level pulse 31a is transmitted. At a moment t2, a data packet 31b is transmitted, which may include at least some of the same information as high-level pulse 31a. At a moment t3, a high-level pulse 32a is transmitted. At a moment t4, a data packet 32b is transmitted, which may include at least some of the same information as high-level pulse 32a. High-level pulse 31a and data packet 31b are transmitted by the same stationary transmitter (say, transmitter 20a in FIG. 4). High-level pulse 32a and data packet 32b are transmitted by another stationary transmitter (say, transmitter 20b in FIG. 4).

Figure 6B:
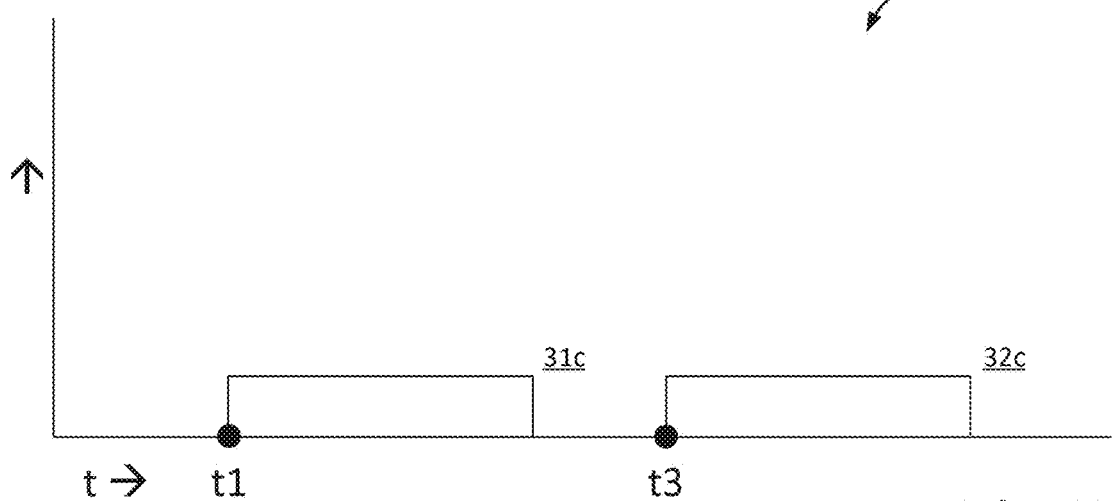
FIG. 6B illustrates an exemplary timeline depicting two timeframes as may be used in a multisite radar system configured for airborne traffic detection between multiple airborne aircraft, in accordance with one or more implementations.

By way of non-limiting example, FIG. 6B illustrates an exemplary timeline 300b depicting two subsequent timeframes as may be used in multisite radar system 100. The horizontal axis depicts time, including sequential moments t1 and t3. The vertical axis depicts power level. At a moment t1, an information packet 31c is transmitted. At a moment t3, an information packet 32c is transmitted. Information packet 31a and information packet 32c are transmitted by different stationary transmitters (say, transmitter 20a and transmitter 20b in FIG. 4).

Referring to FIG. 1, packet component 112 may be configured to generate information packets, data packets, and/or other packetized information. Information packets may include a current timestamp, location information, and/or other information. Data packets may include one or more of a multi-bit sequence, a current timestamp, location information, status information, and/or other information. For example, the multi-bit sequence may be obtained from sequence component 108. For example, the timestamp may be obtained from timing component 114. For example, the location information may describe (or be based on) the geographical location of a particular individual transmitter antenna that is included in a particular stationary transmitter. In some implementations, the location information may refer to the geographical location of a particular individual transmitter antenna that is included in a particular stationary transmitter (e.g., using an index for a known set of locations of stationary transmitters). In some implementations, the status information may convey status information pertaining to a particular station transmitter. Information packets in subsequent timeframes may be transmitted by different stationary transmitters. In some implementations, an individual data packet corresponds to an individual high-power pulse from the same stationary transmitter. Data packets in subsequent timeframes are transmitted by different stationary transmitters.

Timing component 114 may be configured to provide and/or use timing information, e.g., as generated by clock 22. Timing information may be included in a pulse or packet. In some implementations, timing information may be used to wait a predetermined delay duration between subsequent transmissions. For example, timing component 114 may wait between a particular high-power pulse and its subsequent data packet. For example, timing component 114 may wait between subsequent information packets. Timing information may be used to mark the beginning and/or end of a time frame.

Encoding component 116 may be configured to encode information packets, data packets, and/or other information prior to transmission. For example, individual data packets may be encoded using one or more secret keys (e.g., a cryptographic key). In some cases, multisite radar system 100 (in particular encoding component 116) may use a keypair (i.e., a combination of a public key and a private key) to encode information to be transmitted by set of stationary transmitters 20. In some cases, different individual stationary transmitters may reuse the same encoding key. In some implementations, encoding component 116 may be configured to encode high-power pulses prior to transmission.

Aircraft-specific receipt component 120 may be configured to receive and/or detect radar signals from set of stationary transmitters 20, including reflections from objects (e.g., within the detection space). The radar signals may convey information. In some implementations, aircraft-specific receipt component 120 may extract information from radar signals. The conveyed information may include one or more of information packets, high-power pulses (which in turn include multi-bit sequences), reflections of information packets from objects (including one or more targets 16), reflections of high-power pulses from objects (including one or more targets 16), data packets, and/or other information. In some implementations, aircraft-specific receipt component 120 may be configured to detect targets 16.

Aircraft-specific demodulate component 122 may be configured to demodulate radar signals to obtain the conveyed information. For example, aircraft-specific demodulate component 122 may operate in conjunction with one or more demodulators 14. In some cases, aircraft-specific demodulate component 122 may combine individual data streams generated by individual demodulators 14 to obtain and/or otherwise determine the conveyed information. In some implementations, aircraft-specific demodulate component 122 may be configured to perform beamforming and/or thresholding on demodulated radar signals.

Aircraft-specific location component 124 may be configured to determine geographical locations. Aircraft-specific location component 124 may be configured to determine geographical locations of an individual receiver 10 that is associated with aircraft-specific location component 124. In some implementations, aircraft-specific location component 124 may be configured to determine one or more of the orientation, velocity, current time, and/or other information of the individual receiver 10 and/or its corresponding aircraft 15. For example, determinations by aircraft-specific location component 124 may be based on triangulating information from at least three continuous waves, information packets, or high-power pulses from at least three different stationary transmitters 20. In some cases, certain determinations may be based on combining information from at least two different stationary transmitters 20. In some cases, received information may include a direction towards a particular stationary transmitter 20, radial velocity towards a particular stationary transmitter 20, and/or other parameters related to a particular stationary transmitter 20 (e.g., based on doppler shift). In some implementations, values determined by aircraft-specific location component 124 may be tracked using a filter, such as a Kalman filter. In some implementations, to focus on airborne targets, aircraft-specific location component 124 may be configured to ignore and/or otherwise remove information pertaining to stationary structures and objects such as buildings or the ground (e.g., based on doppler shift). In some implementations, receiver 10 may be configured to construct a static ground model based on information regarding stationary structures and objects.

Aircraft-specific location component 124 may be configured to determine geographical locations of one or more targets 16. For example, a geographical location of target 16 may be based on one or more reflections of continuous waves, information packets, or high-power pulses that are included in the received radar signals. For example, determinations by aircraft-specific location component 124 may be based on triangulating reflections from at least three different stationary transmitters 20. In some cases, certain determinations may be based on combining reflections from at least two different stationary transmitters 20.

Figure 5:
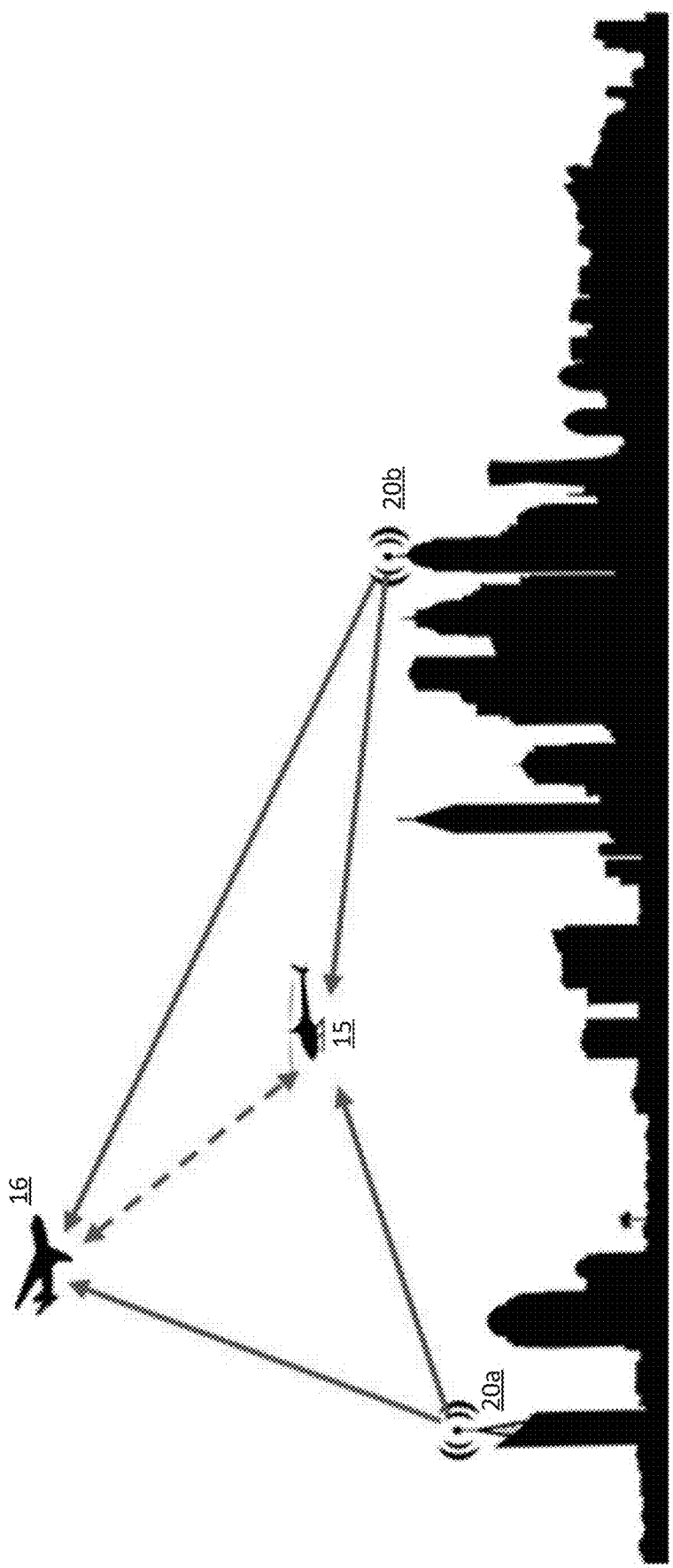
FIG. 5 illustrates a use case of a multisite radar system configured for airborne traffic detection between multiple airborne aircraft, in accordance with one or more implementations.

By way of non-limiting example, FIG. 5 illustrates a use case of multisite radar system 100 configured for airborne traffic detection in a metropolitan area, between aircraft 15 and target 16. Stationary transmitter 20a is transmitting continuous waves, information packets, high-power pulses, and/or data packets in all directions, and these are received by aircraft 15. Stationary transmitter 20b is transmitting continuous waves, information packets, high-power pulses, and/or data packets in all directions, and these are received by aircraft 15, allowing aircraft 15 to determine its own current geographical location. Additionally, continuous waves, information packets, high-power pulses, and/or data packets from both stationary transmitter 20a and stationary transmitter 20b reflect from target 16 and are subsequently received by aircraft 15, allowing aircraft 15 to determine the current geographical location of target 16.

Referring to FIG. 1, aircraft-specific decoding component 126 may be configured to decode information in received radar signals, particularly encoded information conveyed by the received radar signals. For example, aircraft-specific decoding component 126 may decode encoded information using a cryptographic key, matching the operations of encoding component 116. In some implementations, aircraft-specific decoding component 126 may be configured to authenticate received radar signals (e.g., in the same timeframe). For example, in some implementations, aircraft-specific decoding component 126 may authenticate a combination of a (received) high-power pulse and a (received) data packet to confirm these were transmitted by the same stationary transmitter 20. The multi-bit sequence encoded in a particular high-power pulse may need to match the multi-bit sequence included in a particular data packet. In some cases, information from a data packet authenticates the corresponding high-power pulse.

In some implementations, aircraft 15 may support autonomous flight control. Alternatively, and/or simultaneously, in some cases, aircraft 15 may support pilot assistance, in particular non-autonomous pilot assistance or, in other words, assisted flight control. Aircraft 15 may include one or more video cameras 15a and a set of sensors 15b such as, e.g., an altimeter, an airspeed sensor, a compass, etc. Aircraft 15 may receive and/or generate information regarding presence of other aircraft (e.g., during active flight), Automatic Dependent Surveillance-Broadcast (ads-b) information (In and/or Out), radar and/or flight alarm (FLARM) information, Traffic Alert and Collision Avoidance System (TCAS) information, lowest selectable speed (VLS) information, instrument read-out information (e.g., altimeter, airspeed, compass, etc.), timing information, and/or other aircraft-specific information related to aircraft 15.

In some implementations, aircraft 15 may be configured to present interfaces (e.g., user interfaces 125) to users, e.g., through client computing platforms 104 associated with the respective users. Presentations of user interfaces to users may include determined geographical information (and/or information derived therefrom), e.g., as determined by aircraft-specific location component 124. In some cases, aircraft 15 may recommend an action based on a determination, e.g., to evade a particular detected target 16.

Referring to FIG. 1, user interfaces 125 may be configured to facilitate interaction between users 123, multisite radar system 100, and aircraft 15, and/or between users 123 and client computing platforms 104. For example, user interfaces 125 may provide an interface through which users 123 may provide information to and/or receive information from multisite radar system 100 and/or aircraft 15. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in multisite radar system 100. In some implementations, user interface 125 may be a type of interface that facilitates the presentation of information regarding events of interest, e.g., depicted as a timeline.

Referring to FIG. 1, in some implementations, stationary transmitters 20, aircraft 15, receivers 10, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes operative linking via some other communication media.

A given client computing platform 104 may include one or more processors configured to execute computer program components. The computer program components may be configured to enable an expert or user associated with the given client computing platform 104 to interface with multisite radar system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104.

External resources 138 may include sources of information outside of multisite radar system 100, external entities participating with multisite radar system 100, external providers of computation and/or storage services (e.g., a server external to multisite radar system 100), external providers of relevant information (e.g., flight scheduling information, weather information, etc.), and/or other resources. In some implementations, some or all of the functionality attributed herein to external resources 138 may be provided by resources included in multisite radar system 100. In some implementations, one or more external resources 138 may provide information to other components of multisite radar system 100.

Server(s) 102 and aircraft-specific server(s) 111 may include communication lines, or ports to enable the exchange of information with a network and/or other computing platforms. Illustration of server(s) 102 and aircraft-specific server(s) 111 in FIG. 1 is not intended to be limiting. Server(s) 102 and aircraft-specific server(s) 111 may include a plurality of hardware, software, and/or firmware components operating together to provide the functionality attributed herein to server(s) 102 and aircraft-specific server(s) 111. For example, server(s) 102 and/or aircraft-specific server(s) 111 may be implemented by a cloud of computing platforms operating together.

Electronic storage 130 and electronic storage 130a may comprise non-transitory storage media that electronically stores information. The electronic storage media may include one or both of system storage that is provided integrally (i.e., substantially non-removable) with a corresponding server and/or removable storage that is removably connectable to the corresponding server via, for example, a port (e.g., a USB port, a firewire port, etc.) or a drive (e.g., a disk drive, etc.). Electronic storage 130 and electronic storage 130a may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 and electronic storage 130a may include one or more virtual storage resources (e.g., cloud storage, a virtual private network, and/or other virtual storage resources). Electronic storage 130 and electronic storage 130a may store software algorithms, information determined by corresponding processor(s), information received from corresponding server(s), information received from client computing platform(s) 104, and/or other information that enables server(s) 102 and aircraft-specific server(s) 111 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 120, 122, 124, and/or 126, and/or other components. Processor(s) 132 may be configured to execute components 108, 110, 112, 114, 116, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 120, 122, 124, and/or 126 are illustrated in FIG. 1 as being implemented within two separate processing units, this is exemplary. In implementations in which processor(s) 132 and/or processor(s) 132 include multiple processing units, one or more of components 108, 110, 112, 114, 116, 120, 122, 124, and/or 126 may be implemented remotely from the other components. The description of the functionality provided by the different components 108, 110, 112, 114, 116, 120, 122, 124, and/or 126 described below is for illustrative purposes only, and is not intended to be limiting, as any of components 108, 110, 112, 114, 116, 120, 122, 124, and/or 126 may provide more or less functionality than is described. For example, one or more of components 108, 110, 112, 114, 116, 120, 122, 124, and/or 126 may be eliminated, and some or all of its functionality may be provided by other ones of components 108, 110, 112, 114, 116, 120, 122, 124, and/or 126. As another example, processor(s) 132 may be configured to execute one or more additional components that may perform some or all of the functionality attributed below to one of components 108, 110, 112, 114, 116, 120, 122, 124, and/or 126.

Figure 2:
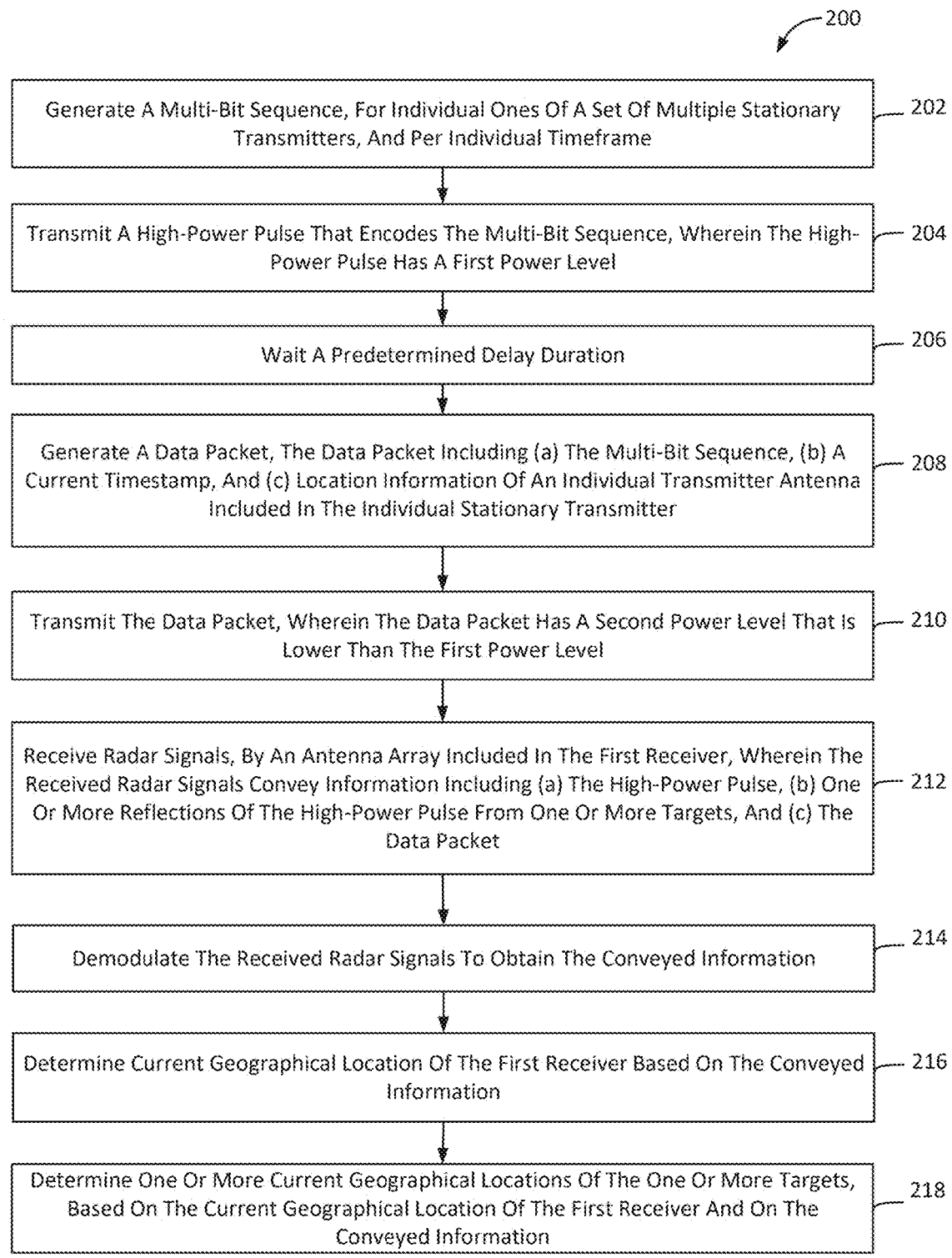
FIG. 2 illustrates a method of detecting airborne traffic between multiple airborne aircraft including a first aircraft, in accordance with one or more implementations.
Figure 3:
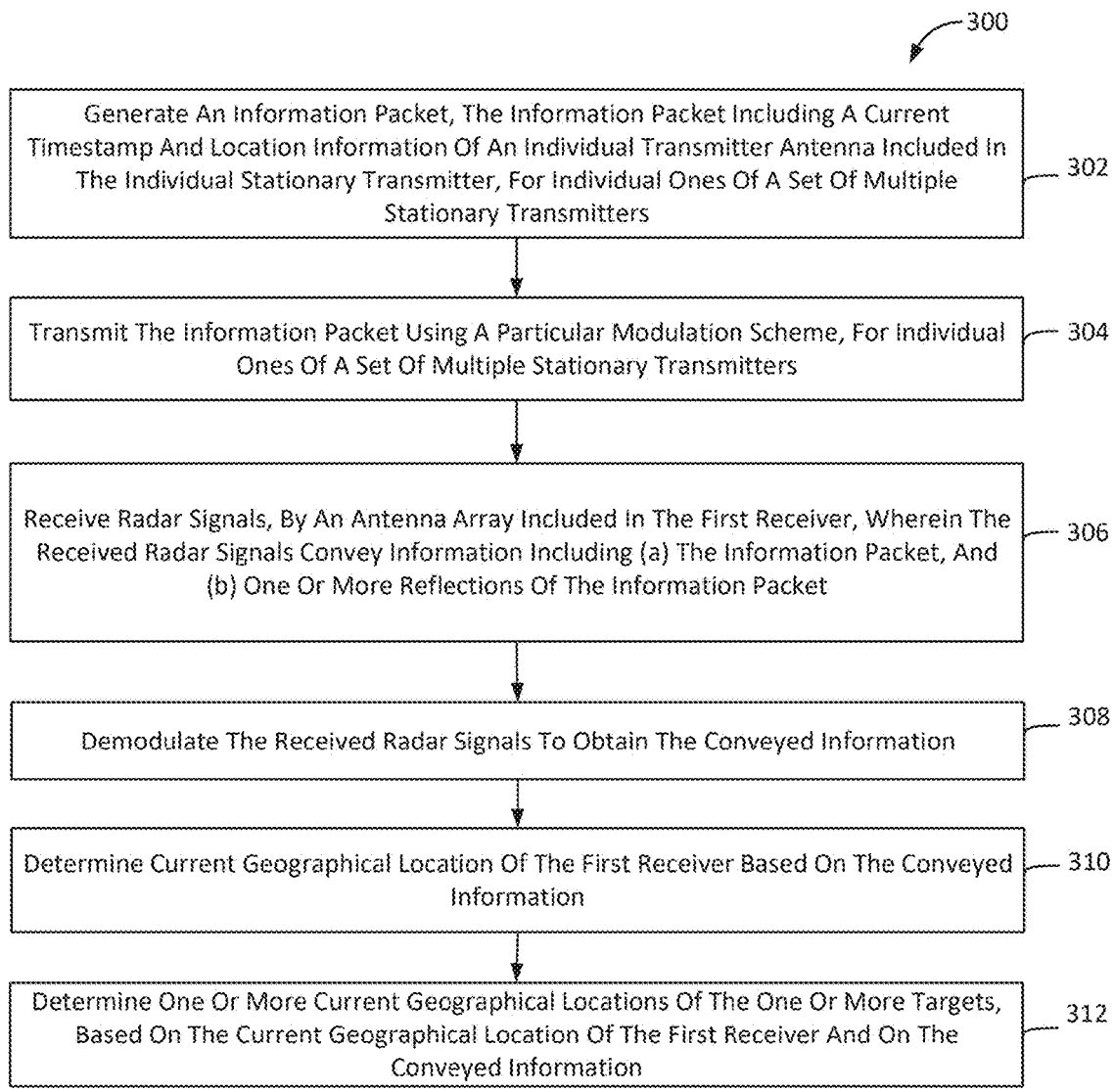
FIG. 3 illustrates a method of detecting airborne traffic between multiple airborne aircraft including a first aircraft, in accordance with one or more implementations.

FIG. 2 and FIG. 3 illustrate a method 200 and a method 300 of detecting airborne traffic between multiple airborne aircraft including a first aircraft, wherein the first aircraft includes a first receiver, in accordance with one or more implementations. The operations of method 200 and method 300 presented below are intended to be illustrative. In some implementations, method 200 and/or method 300 may be accomplished with one or more additional operations not described, and/or without one or more of the operations discussed. Additionally, the order in which the operations of method 200 are illustrated in FIG. 2 and described below is not intended to be limiting. The order in which the operations of method 300 are illustrated in FIG. 3 and described below is not intended to be limiting.

In some implementations, method 200 and/or method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

Regarding method 200, at an operation 202, a multi-bit sequence is generated, for individual ones of a set of multiple stationary transmitters, and per individual timeframe. In some embodiments, operation 202 is performed by a sequence component the same as or similar to sequence component 108 (shown in FIG. 1 and described herein).

At an operation 204, a high-power pulse is transmitted that encodes the multi-bit sequence. The high-power pulse has a first power level. In some embodiments, operation 204 is performed by a transmission component the same as or similar to transmission component 110 (shown in FIG. 1 and described herein).

At an operation 206, the method waits for a predetermined delay duration. In some embodiments, operation 206 is performed by a timing component the same as or similar to timing component 114 (shown in FIG. 1 and described herein).

At an operation 208, a data packet is generated, the data packet including (a) the multi-bit sequence, (b) a current timestamp, and (c) location information of an individual transmitter antenna included in the individual stationary transmitter. In some embodiments, operation 208 is performed by a packet component the same as or similar to packet component 112 (shown in FIG. 1 and described herein).

At an operation 210, the data packet is transmitted. The data packet has a second power level that is lower than the first power level. In some embodiments, operation 210 is performed by a transmission component the same as or similar to transmission component 110 (shown in FIG. 1 and described herein).

At an operation 212, radar signals are received, using an antenna array included in the first receiver. The received radar signals convey information including (a) the high-power pulse, (b) one or more reflections of the high-power pulse from one or more targets, and (c) the data packet. In some embodiments, operation 212 is performed by an antenna array and/or an aircraft-specific receipt component the same as or similar to antenna array 12 and/or aircraft-specific receipt component 120 (shown in FIG. 1 and described herein).

At an operation 214, the received radar signals are demodulated to obtain the conveyed information. In some embodiments, operation 214 is performed by demodulator(s) and an aircraft-specific demodulate component the same as or similar to demodulator(s) 14 and/or aircraft-specific demodulate component 122 (shown in FIG. 1 and described herein).

At an operation 216, the current geographical location of the first receiver is determined based on the conveyed information. In some embodiments, operation 216 is performed by an aircraft-specific location component the same as or similar to aircraft-specific location component 124 (shown in FIG. 1 and described herein).

At an operation 218, one or more current geographical locations of the one or more targets are determined, based on the current geographical location of the first receiver and on the conveyed information. In some embodiments, operation 218 is performed by an aircraft-specific location component the same as or similar to aircraft-specific location component 124 (shown in FIG. 1 and described herein).

Regarding method 300, at an operation 302, per individual ones of a set of multiple stationary transmitters, an information packet is generated, the information packet including a current timestamp and location information of an individual transmitter antenna included in the individual stationary transmitter. In some embodiments, operation 302 is performed by a packet component the same as or similar to packet component 112 (shown in FIG. 1 and described herein).

At an operation 304, per individual ones of the set of multiple stationary transmitters, the information packet are transmitted using a particular modulation scheme. In some embodiments, operation 304 is performed by a transmission component the same as or similar to transmission component 110 (shown in FIG. 1 and described herein).

At an operation 306, radar signals are received, using an antenna array included in the first receiver. The received radar signals convey information including (a) the information packet, and (b) one or more reflections of the information packet from one or more targets. In some embodiments, operation 306 is performed by an antenna array and/or an aircraft-specific receipt component the same as or similar to antenna array 12 and/or aircraft-specific receipt component 120 (shown in FIG. 1 and described herein).

At an operation 308, the received radar signals are demodulated to obtain the conveyed information. In some embodiments, operation 308 is performed by demodulator(s) and an aircraft-specific demodulate component the same as or similar to demodulator(s) 14 and/or aircraft-specific demodulate component 122 (shown in FIG. 1 and described herein).

At an operation 310, the current geographical location of the first receiver is determined based on the conveyed information. In some embodiments, operation 310 is performed by an aircraft-specific location component the same as or similar to aircraft-specific location component 124 (shown in FIG. 1 and described herein).

At an operation 312, one or more current geographical locations of the one or more targets are determined, based on the current geographical location of the first receiver and on the conveyed information. In some embodiments, operation 312 is performed by an aircraft-specific location component the same as or similar to aircraft-specific location component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A multisite radar system configured for airborne traffic detection between multiple airborne aircraft including a first aircraft, wherein the first aircraft includes a first receiver, the system comprising:
  a set of multiple stationary transmitters that are stationary with respect to their geographical location on Earth, wherein the set of multiple stationary transmitters includes a first transmitter, a second transmitter, and a third transmitter, wherein individual ones of the set of multiple stationary transmitters include one or more hardware processors configured by machine-readable instructions to:
    per individual stationary transmitter, (i) generate an information packet, the information packet including a current timestamp and location information of an individual transmitter antenna included in the individual stationary transmitter, and (ii) transmit the information packet using a particular modulation scheme; and
  the first receiver included in the first aircraft, wherein the first receiver is configured to receive radar signals from the set of multiple stationary transmitters, the first receiver including:
    an antenna array configured to receive the radar signals, wherein the received radar signals convey information, wherein the conveyed information includes:
      (a) a first information packet from the first transmitter, a second information packet from the second transmitter, and a third information packet from the third transmitter, and (b) one or more reflections of the first, second, and third information packets from one or more targets; and one or more physical processors configured by machine-readable instructions to:

demodulate the received radar signals to obtain the conveyed information;

determine a current geographical location of the first receiver included in the first aircraft, wherein determination is based on the conveyed information from the first, second, and third transmitters; and determine one or more current geographical locations of the one or more targets, based on the current geographical location of the first receiver and further based on the reflections included in the conveyed information.

2. The multisite radar system of claim 1, wherein an individual stationary transmitter includes an atomic clock, an oscillator configured to generate a carrier signal, and a transmitter antenna configured to transmit the information packet after modulation in accordance with the particular modulation scheme, wherein the current timestamp is based on the atomic clock, and wherein the information packet as modulated further includes a multi-bit sequence that has been encoded.

3. The multisite radar system of claim 1, wherein the particular modulation scheme uses either discrete pulses or continuous wave (CW) technology.

4. The multisite radar system of claim 3, wherein the continuous wave (CW) technology used for the particular modulation scheme is based on at least one of (i) Frequency Modulated Continuous Wave (FMCW), or (ii) Orthogonal Frequency Division Multiplexing (OFDM).

5. The multisite radar system of claim 1, wherein individual ones of the set of multiple stationary transmitters are configured to transmit a pulse having a first power level, wherein the information packet is transmitted using a second power level, and wherein the first power level is greater than the second power level arranged to cover a particular geographical area.

6. The multisite radar system of claim 1, wherein the set of multiple stationary transmitters are arranged to cover a particular geographical area, wherein the location information of the individual transmitter antenna includes geographical coordinates.

7. The multisite radar system of claim 1, wherein the antenna array is a 3×3 phased antenna array of dipole antenna elements, and wherein the first receiver includes nine demodulators that correspond to individual dipole antenna elements of the antenna array.

8. The multisite radar system of claim 1, wherein the one or more physical processors included in the first receiver are further configured to:

authenticate the conveyed information.

9. The multisite radar system of claim 1, wherein the determination of the current geographical location of the first receiver is based on triangulating at least three information packets from three different ones of the set of multiple stationary transmitters.

10. The multisite radar system of claim 1, wherein the information packet is encoded with a key that is used among the set of multiple stationary transmitters.

11. A method of detecting airborne traffic between multiple airborne aircraft including a first aircraft, wherein the first aircraft includes a first receiver, the method comprising:

for individual ones of a set of multiple stationary transmitters, generating an information packet, the information packet including a current timestamp and location information of an individual transmitter antenna included in the individual stationary transmitter, wherein the set of multiple stationary transmitters are stationary with respect to their geographical location on Earth, wherein the set of multiple stationary transmitters includes a first transmitter, a second transmitter, and a third transmitter;

for individual ones of the set of multiple stationary transmitters, transmitting the information packet using a particular modulation scheme such that the first transmitter transmits a first information packet, the second transmitter transmits a second information packet, and the third transmitter transmits a third information packet;

receiving radar signals, by an antenna array included in the first receiver, wherein the received radar signals convey information including:

(a) the first information packet, the second information packet, and the third information packet, and (b) reflections of the first, second, and third information packets from one or more targets;

demodulating the received radar signals to obtain the conveyed information;

determining a current geographical location of the first receiver included in the first aircraft, wherein the determining is based on the conveyed information from the first, second, and third transmitters; and determining one or more current geographical locations of the one or more targets, based on the current geographical location of the first receiver and further based on the reflections included in the conveyed information.

12. The method of claim 11, wherein an individual stationary transmitter includes an atomic clock, an oscillator that generates a carrier signal, and a transmitter antenna that transmits the information packet after modulation in accordance with the particular modulation scheme, wherein the current timestamp is based on the atomic clock, and wherein the information packet as modulated further includes a multi-bit sequence that has been encoded.

13. The method of claim 11, wherein the particular modulation scheme uses either discrete pulses or continuous wave (CW) technology.

14. The method of claim 13, wherein the continuous wave (CW) technology used for the particular modulation scheme is based on at least one of (i) Frequency Modulated Continuous Wave (FMCW), or (ii) Orthogonal Frequency Division Multiplexing (OFDM).

15. The method of claim 11, wherein individual ones of the set of multiple stationary transmitters transmit a pulse having a first power level, wherein the information packet is transmitted using a second power level, and wherein the first power level is greater than the second power level.

16. The method of claim 11, wherein the set of multiple stationary transmitters are arranged to cover a particular geographical area, wherein the location information of the individual transmitter antenna includes geographical coordinates.

17. The method of claim 11, wherein the antenna array is a 3×3 phased antenna array of dipole antenna elements, wherein the first receiver includes nine demodulators that correspond to individual dipole antenna elements of the antenna array, and wherein demodulating the received radar signals is performed using the nine demodulators.

18. The method of claim 11, further comprising:

authenticating the conveyed information.

19. The method of claim 11, and wherein determining the current geographical location of the first receiver includes triangulating at least three information packets from three different ones of the set of multiple stationary transmitters.

20. The method of claim 11, wherein the information packet is encoded with a key that is used among the set of multiple stationary transmitters.

* * * * *